US007929061B2

(12) United States Patent
Katayama

(10) Patent No.: US 7,929,061 B2
(45) Date of Patent: Apr. 19, 2011

(54) SIGNAL PROCESSING APPARATUS AND SIGNAL PROCESSING METHOD

(75) Inventor: Hiroshi Katayama, Chiba (JP)

(73) Assignee: Sony Corporation, Tokyo (JP)

( * ) Notice: Subject to any disclaimer, the term of this patent is extended or adjusted under 35 U.S.C. 154(b) by 1572 days.

(21) Appl. No.: 10/508,372

(22) PCT Filed: Mar. 19, 2003

(86) PCT No.: PCT/JP03/03335
§ 371 (c)(1),
(2), (4) Date: Sep. 17, 2004

(87) PCT Pub. No.: WO03/079676
PCT Pub. Date: Sep. 25, 2003

(65) Prior Publication Data
US 2005/0172320 A1      Aug. 4, 2005

(30) Foreign Application Priority Data

Mar. 19, 2002   (JP) ............................... P2002-075978

(51) Int. Cl.
*H04N 5/50* (2006.01)
(52) U.S. Cl. ........... 348/731; 725/38; 725/139; 725/151
(58) Field of Classification Search .................. None
See application file for complete search history.

(56) References Cited

U.S. PATENT DOCUMENTS

| | | | | |
|---|---|---|---|---|
| 5,699,125 A * | 12/1997 | Rzeszewski et al. | ........... | 725/50 |
| 5,708,961 A * | 1/1998 | Hylton et al. | ........... | 725/81 |
| 5,933,192 A * | 8/1999 | Crosby et al. | ........... | 348/731 |
| 6,212,680 B1 * | 4/2001 | Tsinberg et al. | ........... | 725/39 |
| 6,334,217 B1 * | 12/2001 | Kim | ........... | 348/731 |
| 6,477,522 B1 * | 11/2002 | Young | ........... | 709/224 |
| 6,480,707 B1 * | 11/2002 | Hirose et al. | ........... | 455/179.1 |
| 6,519,011 B1 * | 2/2003 | Shendar | ........... | 348/731 |
| 6,804,824 B1 * | 10/2004 | Potrebic et al. | ........... | 725/38 |
| 6,907,270 B1 * | 6/2005 | Blanz | ........... | 455/562.1 |
| 7,086,077 B2 * | 8/2006 | Giammaressi | ........... | 725/95 |
| 7,133,380 B1 * | 11/2006 | Winters et al. | ........... | 370/329 |
| 2001/0033625 A1 * | 10/2001 | Ninomiya et al. | ........... | 375/316 |
| 2003/0115589 A1 * | 6/2003 | D'Souza et al. | ........... | 725/10 |
| 2003/0159157 A1 * | 8/2003 | Chan | ........... | 725/46 |

FOREIGN PATENT DOCUMENTS

| | | |
|---|---|---|
| EP | 1 185 087 | 3/2002 |
| JP | 7-177504 | 7/1995 |
| JP | 10-294930 | 11/1998 |
| JP | 11-27637 | 1/1999 |
| JP | 2001-77712 | 3/2001 |
| JP | 2001-346123 | 12/2001 |
| WO | WO 00 64050 | 10/2000 |

\* cited by examiner

*Primary Examiner* — Brian T Pendleton
*Assistant Examiner* — Dika C. Okeke
(74) *Attorney, Agent, or Firm* — Frommer Lawrence & Haug LLP; William S. Frommer; Thomas F. Presson

(57) ABSTRACT

An apparatus and a method for allowing a digital broadcast receiver smoothly to switch from one broadcast channel to another. In response to a reproduction output request, encoded data that are requested to be reproduced and output are selected and decoded accordingly. At substantially the same time, arrangements may be provided to select and decode other encoded data in accordance with a predetermined rule. Whenever the encoded data selected using the predetermined rule are to be reproduced and output on request, conventionally required demultiplexing and decoding processes are not needed.

8 Claims, 6 Drawing Sheets

SIGNAL PROCESSING APPARATUS AND SIGNAL PROCESSING METHOD

TECHNICAL FIELD

The present invention relates to a signal processing apparatus and a signal processing method for having illustratively an encoded digital broadcast signal entered and for decoding the entered signal.

BACKGROUND ART

The start some time ago of digital satellite broadcasting has been followed by widespread acceptance of digital satellite broadcast receivers by the general public. A large number of broadcast stations are offering digital satellite broadcast services. The digital satellite broadcast receiver is typically designed to let any one of multiple channels be selected from among the numerous offerings.

FIG. 5 is a block diagram outlining an internal structure of a conventional digital satellite broadcast receiver.

As illustrated, the digital satellite broadcast receiver includes a front end section 51, a demultiplexer 52, a decoder 53, and a system controller 50 that controls these components.

The front end section 51 acts on a setting signal supplied from the system controller 50, the signal designating transmission specifications and other technical details. In accordance with the supplied setting signal, the front end section 51 receives through a parabola antenna (not shown) a carrier (reception frequency) designated by the signal. From the carrier, the front end section 51 acquires a transport stream (TS) through a Viterbi decoding process and an error correction process.

As is well known, the transport stream as per the digital satellite broadcast criteria is constituted by signal data in compressed form, multiplexed with diverse kinds of additional information. The compressed data are prepared by compressing video and audio signals of a plurality of broadcast programs in accordance with MPEG-2 (Moving Picture Experts Group Layer 2). The additional information, to be inserted by broadcast stations, includes PSI (program specific information) accommodating tables such as PAT (program association table) and PMT (program map table), and SI (service information, serving as program schedule information).

The front end section 51 obtains PSI (program specific information) packets from the transport stream (TS) in order to update channel select information. From the transport stream, the front end section 51 also acquires a component PID (program ID) on each of the available channels and forwards the acquired component PID's illustratively to the system controller 50. The system controller 50 utilizes the received PID's in processing the received signals.

In keeping with a filtering condition established by the system controller 50, the demultiplexer 52 filters out necessary TS packets from the transport stream supplied by the front end section 51, in a manner to be described later. Illustratively, the demultiplexer 52 obtains regarding a target broadcast program two kinds of TS packets: TS packets of video data compressed in the MPEG-2 format, and TS packets of audio data compressed also in the MPEG-2 format. The compressed video and audio data thus acquired are output to the decoder 53.

The decoder 53 is made up of a video decoder and an audio decoder. The video decoder decodes compressed video data in accordance with the MPEG-2 format for output. The audio decoder decodes compressed audio data in keeping with the MPEG-2 format and outputs the decoded audio data in synchronism with the video data output. The compressed video and audio data that have been input are thus decoded by the video decoder and audio decoder respectively.

The video and audio data that have been decoded and synchronized as outlined above are output for reproduction purposes by the decoder 53.

In operation, the conventional digital satellite broadcast receiver of the above-described structure may receive a channel select request from a user manipulating the receiver. In such a case, the steps outlined below are typically carried out.

FIG. 6 is a flowchart of steps in which the conventional digital satellite broadcast receiver selects a channel.

In step S1001, the system controller 50 of the receiver checks continuously whether a channel select request is made. If the channel select request is found to be made, the system controller 50 goes to step S1002 and recognizes the channel number of the requested channel.

In step S1003, NIT (network information table) is received on the basis of PAT (program association table). As is well known, NIT includes channel-related physical characteristic information (e.g., satellite orbit data, polarized waves, and frequency of each of the transponders associated with digital satellite broadcasts). The received NIT is used in step S1003 as a basis for recognizing the transponder frequency covering the requested channel.

In step S1003, the frequency thus recognized is set anew for the front end section 51. This causes the front end section 51 to receive the transponder frequency covering the requested channel.

In step S1004, PAT is acquired from the transponder frequency received anew by the front end section 51. In step S1005, PMT of the requested channel is received in accordance with information in the newly-received PAT.

In step S1006, a filtering condition is set for the demultiplexer 52 based on PMT. The condition allows the demultiplexer 52 to filter out only the packets of the requested channel from the transport stream of the transponder, whereby stream data are obtained.

In step S1007, SH (sequence header) is detected from the stream data acquired by the demultiplexer 52 in the manner described above. From the detected SH, the demultiplexer 52 recognizes a video format (e.g., standard definition (SD) or high definition (HD)) of the stream data on the requested channel.

In step S1008, SH detected in step S1007 is used as a basis for establishing various settings needed by the decoder 53 to operate in keeping with the relevant format.

In step S1009, the decoder 53 is prompted to execute a decoding process based on the settings. The decoder 53 thereby establishes synchronization between video data and audio data.

In step S1010, the decoder 53 is prompted to output the video and audio data thus prepared. This is how the audio and video data from the channel requested in step S1001 are output.

As described, the conventional digital satellite broadcast receiver performs two stages of processing, i.e., demultiplexing (steps S1002 through S1006 in FIG. 6) and decoding (steps S1007 through S1009), from the time a channel select request is made until an image of the requested channel is displayed.

As can be seen from the foregoing description, the demultiplexing process can take long, as much as hundreds of milliseconds. That is because the process involves carrying out a fairly large number of steps in sending and receiving various signals. Likewise, the decoding process can take hundreds of milliseconds because it is relatively complicated in execution.

As a result, the conventional digital satellite broadcast receiver can take up to one second between the channel select request and the output of video display. This amounts to a substantially long delay in channel selection compared with the typical analog TV set (television receiver) receiving analog broadcasts.

With such behavior, many conventional digital satellite broadcast receivers have often aroused in their users a feeling of awkwardness due to the prolonged channel select time that is considerably longer than that of analog TV sets.

DISCLOSURE OF INVENTION

The present invention has been made in view of the above circumstances and provides a signal processing apparatus that is structured as outlined below.

According to one aspect of the invention, there is provided a signal processing apparatus comprising: an inputting means for inputting a designated plurality of encoded data; an encoded data selecting means for selectively outputting a designated plurality of encoded data from a plurality of encoded data which have been input by the inputting means; and a plurality of decoding means for individually inputting the plurality of encoded data selected by the encoded data selecting means while decoding the encoded data which have been input.

The signal processing apparatus further comprises: an encoded data designating means for designating encoded data for the inputting means and for the encoded data selecting means in such a manner that in response to a reproduction output request, the encoded data requested to be reproduced and output and other encoded data which are selected in accordance with a predetermined rule and which differ from the encoded data requested to be reproduced and output are input individually to the plurality of decoding means; and a reproduction output controlling means for controlling the plurality of decoding means to output only the encoded data requested to be reproduced and output following the decoding in response to the reproduction output request.

When the above structure is in place, the encoded data designating means specifies that one of the decoding means is to decode the encoded data requested to be reproduced and output. Concurrently, the encoded data designating means specifies that another decoding means is to decode other encoded data which differ from the encoded data to be reproduced and output and which are selected in accordance with a predetermined rule.

If the reproduction output request is made for the encoded data selected in keeping with the predetermined rule, then the reproduction output controlling means permits output of the encoded data in question which have been decoded beforehand as described.

Where the encoded data selected in accordance with the predetermined rule are decoded in advance, the reproduction output request made for the encoded data in question causes the data to be reproduced and output without the need for the selecting process by the encoded data selecting means, for the designating process by the encoded data designating means, and for the decoding process by the decoding means.

BEST MODE FOR CARRYING OUT THE INVENTION

Figure 1:
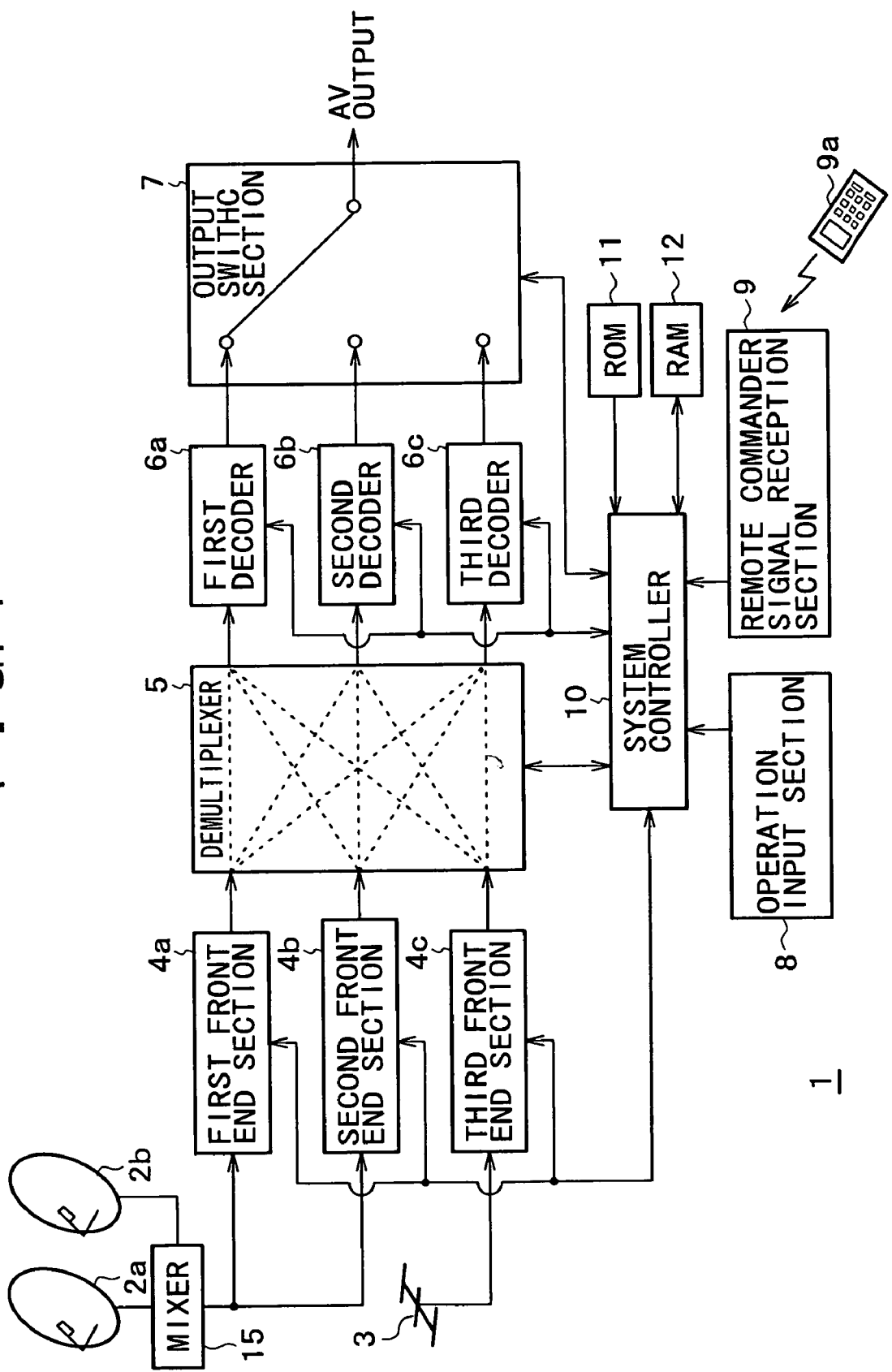
FIG. 1 is a block diagram showing a principal internal structure of a digital broadcast receiver 1 practiced as an embodiment of this invention.

FIG. 1 is a block diagram showing a principal internal structure of the digital broadcast receiver 1 to which a signal processing circuit embodying this invention is applied. As illustrated, the digital broadcast receiver 1 has a dual-tuner pack structure including a first front end section 4a and a second front end section 4b.

The digital broadcast receiver 1 also includes, as shown, a third front end section 4c that acts as a tuner pack for addressing terrestrial digital broadcasts. The multiple front end sections 4 thus furnished allow the digital broadcast receiver 1 to admit a plurality of transponder frequencies simultaneously.

The first front end section 4a and second front end section 4b are connected to a BS parabola antenna 2a and a CS parabola antenna 2b set up outside an enclosure of the digital broadcast receiver 1. The two parabola antennas 2a and 2b receive broadcast signals via satellite and have them converted into predetermined high-frequency signals using built-in low noise block down converters (LNB). The high-frequency signals are forward as the received signals through a mixer 15 (shown) to the first and the second front end sections 4a and 4b.

Likewise, the third front end section 4c is connected to a terrestrial wave antenna 3 that receives terrestrial digital broadcast signals. The received signals are fed to the third front end section 4c.

The first, the second and the third front end sections 4a, 4b and 4c operate on a setting signal supplied by a system controller 10, the setting signal designating transmission-related specifications and other relevant details. Given the setting signal, the front end sections accordingly receive transponder (carrier) frequencies that are subjected to Viterbi decoding and error correction, whereby a transport stream (TS) is obtained.

As is well known, the transport stream as per digital satellite broadcast criteria has compressed data multiplexed with diverse kinds of additional information. The compressed data are prepared by compressing video and audio signals of a plurality of broadcast programs illustratively in accordance with MPEG-2 (Moving Picture Experts Group Layer 2) standards.

The compressed data made up of the video and audio signals are multiplexed into an elementary stream (ES). The additional information to be inserted by broadcast stations includes PSI (program specific information) including tables such as PAT (program association table) and PMT (program map table), and SI (service information, serving as program schedule information).

The multiplexing of the information above is accomplished as follows: the transport stream is first formed with 188-byte transport stream packets (TS packets). The elementary stream (ES) described above and the diverse kinds of additional information are then placed into the TS packets to constitute the transport stream in its multiplexed form.

Each of the first through the third front end sections 4a through 4c acquires PSI (program specific information) packets from the transport stream in order to update channel select information. At the same time, each front end section obtains from the transport stream a component PID (program ID) on each of the available channels and forwards the acquired component PID's illustratively to the system controller 10. The system controller 10 utilizes the received PID's in processing the received signals.

In keeping with a filtering condition established by the system controller 10, a demultiplexer 5 filters out necessary TS packets from the transport stream supplied by the front end sections 4. Illustratively, the demultiplexer 5 obtains regarding a target broadcast program two kinds of TS packets: TS packets of video data compressed in the MPEG-2 format, and TS packets of audio data compressed also in the MPEG-2 format.

Under control of the system controller 10, the demultiplexer 5 outputs the compressed video and audio data thus acquired to a first decoder 6a, a second decoder 6b and a third decoder 6c (to be described later) in matrix fashion. More specifically, the transport stream acquired from the first front end section 4a may be output to the third decoder 6c, the TS from the second front end section 4b to the first decoder 6a, and the TS from the third front end section 4c to the second decoder 6b.

The individual packets of the compressed video/audio data filtered out by the demultiplexer 5 are input to the first decoder 6a, second decoder 6b, and third decoder 6c in PES (packetized elementary stream) form.

The filtering condition is established as follows: the demultiplexer 5 first extracts PAT, PMT, etc., from the transport stream and transfers the extracted tables to the system controller 10. In turn, the system controller 10 sets the filtering condition for the demultiplexer 5 on the basis of the specifics described in the transferred tables.

The first, the second and the third decoders 6a, 6b and 6c are each made up of a video decoder and an audio decoder. The video decoder decodes input compressed video data in accordance with the MPEG-2 format. The audio decoder decodes input compressed audio data in keeping with the MPEG-2 format. The compressed video and audio data that have been input are thus decoded by the video decoder and audio decoder respectively.

Each of the first, the second and the third decoders 6a, 6b and 6c synchronizes the decoded video and audio data based on PTS (presentation time stamp, serving as output time management information) that has been multiplexed with the broadcast signals and which is supplied by the demultiplexer 5. The video and audio data thus synchronized are fed to an output switch section 7 as illustrated.

As described above, the digital broadcast receiver 1 embodying this invention includes three decoders, i.e., the first, the second and the third decoders 6a, 6b and 6c. This multiple decoder arrangement allows stream data on a plurality of channels to be decoded simultaneously.

For example, the first decoder 6a may be arranged to decode the data on the currently-selected broadcast channel as will be discussed later. The second decoder 6b and third decoder 6c may predecode the data on other channels that are set according to a predetermined rule.

In this description, all decoding over the channels that are different from the currently-selected channel is referred to as predecoding.

Under control of the system controller 10, the output switch section 7 switches the output of the video and audio data coming from the first through the third decoders 6a through 6c. In this manner, the output switch section 7 outputs the audio and video data requested to be reproduced and output on one channel at a time, as illustrated.

An operation input section 8 is constituted by a plurality of operating elements, not shown, furnished outside the enclosure of the digital broadcast receiver 1. The operating elements illustratively include: channel select keys for selecting a desired channel from received broadcast signals (i.e., keys for making a channel select request); successive channel select keys for successively selecting channel numbers; and direct channel select keys for directly selecting each of the available channels. Also included are broadcast select keys for selecting any one of the BS, CS, and terrestrial broadcasts.

The operation input section 8 of the above constitution is arranged to supply the system controller 10 with operation signals representative of the operating elements being operated on. The system controller 10 carries out its processing based on the supplied operation signals.

A remote commander signal reception section 9 receives command signals illustratively in infrared rays from a remote commander 9a shown in FIG. 1. In turn, the remote commander signal reception section 9 supplies the system controller 10 with operation signals representing the received command signals. As is the case with the operation input section 8, the system controller 10 performs its processing on the basis of the supplied operation signals.

It is assumed that the remote commander 9a at least has operating elements for permitting the operations equivalent to those made on the above-mentioned operation input section 8.

A RAM 12 is furnished to act as a work area for use by the system controller 10. The system controller 10 writes and reads data to and from the RAM 12 as needed.

A ROM 11 is a nonvolatile memory such as a flash memory. The ROM 11 contains programs that allow the system controller 10 to provide overall control on all configured devices. The system controller 10 performs its operations in keeping with these programs.

The ROM 11 also contains a program that permits the setting of predecoded channels and the execution of channel select operations. The system controller 10 operating in accordance with this program allows the digital broadcast receiver 1 to implement a channel select operation and a predecoded channel setting operation, to be described later.

For the inventive digital broadcast receiver 1 structured as described above, it is assumed that the channel number immediately preceding the currently-selected channel number and the channel number immediately following it are selected as the predecoded channels. That assumption is predicated on another assumption: that the channel select operation is performed by the user most often operating the successive channel select keys.

That is, the channels likely to be selected by operation of the frequently-used channel select keys are set to be predecoded at all times. This leads to an enhanced possibility that one of the predecoded channels will be selected next.

For example, suppose that the currently-selected channel number is 100. In that case, the digital broadcast receiver 1 of this embodiment works illustratively as follows:

Where the transport stream containing the stream data on channel No. 100 is being acquired by the first front end section 4a, the transport stream including the stream data on the immediately-preceding channel No. 99 may be obtained by the second front end section 4b, and the transport stream including the stream data on the immediately-following channel No. 101 may be gained by the third front end section 4c.

Where the demultiplexer 5 feeds the transport stream of channel No. 100 to the first decoder 6a for decoding, the transport stream of channel No. 99 and that of channel No. 101 may be fed by the demultiplexer 5 to the second decoder 6b and third decoder 6c for predecoding, respectively.

In the case above, the output switch section 7 connects its output switch to the first decoder 6a decoding the currently-selected channel No. 100. This allows the data on channel No. 100 alone to be output.

Suppose now that the user selects channel No. 101 by operating on the successive channel select keys. The channel select operation causes the output switch section 7 to connect its output switch to the third decoder 6c decoding channel No. 101. This allows the data on channel No. 101 to be reproduced and output.

That is, the channel select operation leads directly to the switching of the output switch section 7, and the data on the newly-selected channel can be reproduced and output immediately.

In parallel with the reproduction and output of channel No. 101, the channel select operation initiates the setting of new channels to be predecoded, i.e., channel No. 100 immediately preceding the currently-selected channel No. 101 and channel No. 102 immediately following it.

Figure 2:
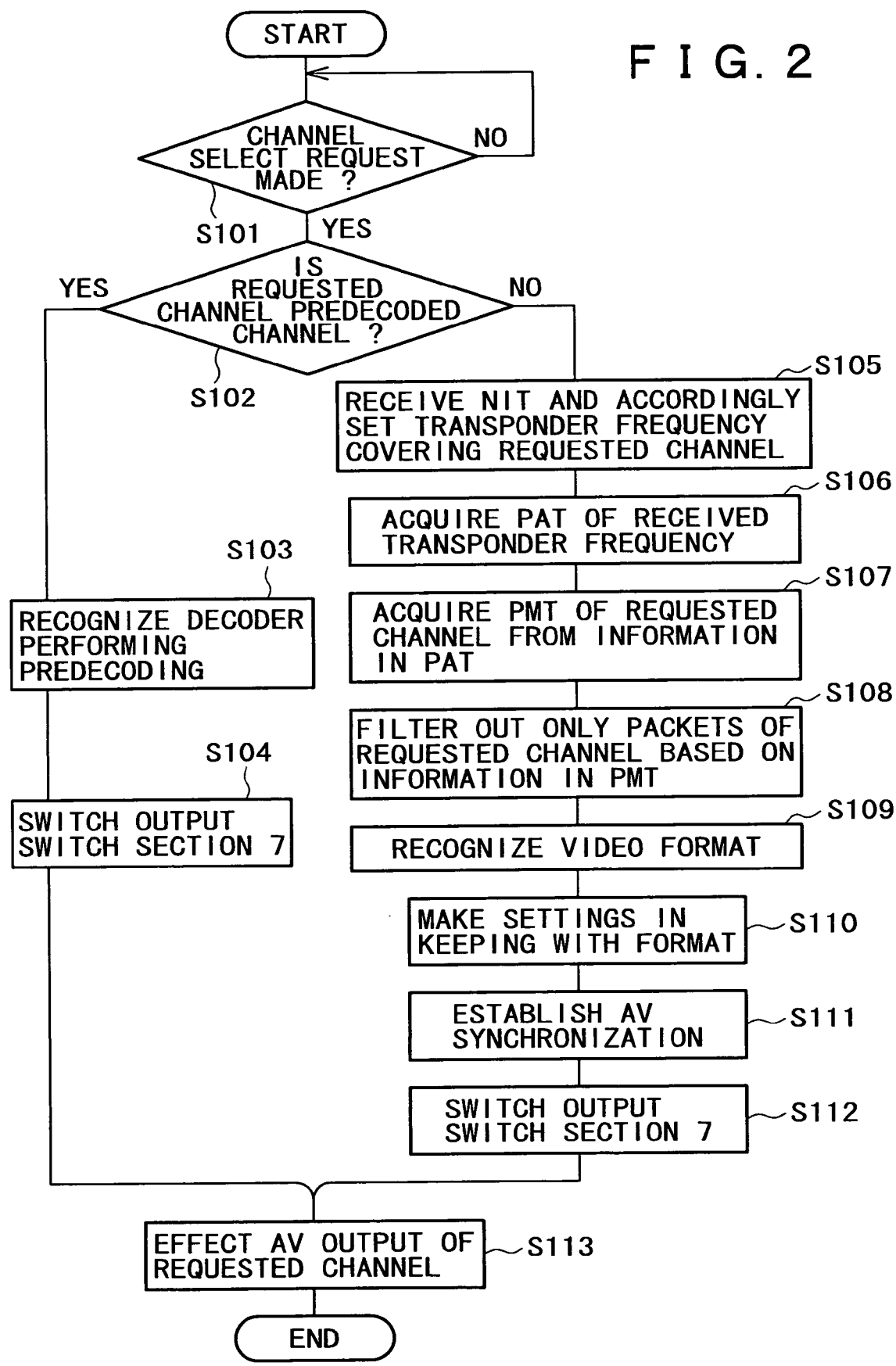
FIG. 2 is a flowchart of steps constituting a channel selection process performed by the digital broadcast receiver 1 as the embodiment of the invention.

FIG. 2 is a flowchart of steps constituting such a channel selection process performed by this embodiment of the invention. In step S101 of FIG. 2, the system controller 10 checks continuously whether a channel select request (i.e., reproduction output request) is made, illustratively by the user performing a channel select operation on the operation input section 8 or on the remote commander 9a. If the channel select request is recognized, step S102 is reached.

In step S102, the system controller 10 checks whether the channel designated by the channel select request (called the requested channel hereunder) is a predecoded channel.

In practice, after the channel select request is detected in step S101, the check in step S102 is carried out in parallel with the above-described process in which the channel number immediately preceding the requested channel and the channel number immediately following it are established as predecoded channels.

With this digital broadcast receiver 1, each of the predecoded channels thus established is subject to demultiplexing (steps S105 through 108, to be described later) and decoding (steps S109 through S112, to be discussed later) in parallel with the reproduction and output of what is being broadcast on the requested channel.

If the requested channel is not found to be a predecoded channel in step S102, then step S105 is reached. From step S105 on, demultiplexing and decoding are carried out as described below. That is, the same processing as the conventional set of channel select operations is executed.

In step S105, NIT (network information table) is received on the basis of the above-described PAT. As is well known, NIT includes channel-related physical characteristic information (e.g., satellite orbit data, polarized waves, and frequency of each of the transponders associated with digital satellite broadcasts). The received NIT is used in step S105 as a basis for recognizing the transponder frequency covering the requested channel.

In step S105, the frequency thus recognized is set anew for any one of the front end sections 4. This causes the front end section 4 in question to receive the transponder frequency covering the requested channel.

In step S106, PAT is acquired from the transponder frequency received anew by the front end section 4. In step S107, PMT of the requested channel is received in accordance with information in the newly-received PAT.

In step S108, a filtering condition is set for the demultiplexer 5 based on PMT. The condition allows the demultiplexer 5 to filter out only the packets of the requested channel from the transport stream of the transponder, whereby stream data are obtained.

In step S109, SH (sequence header) is detected from the stream data acquired by the demultiplexer 5 in the manner described above. From the detected SH, the demultiplexer 5 recognizes a video format of compressed video data (e.g., standard definition (SD) or high definition (HD)) of the stream data on the requested channel.

In step S110, SH detected in step S109 is used as a basis for establishing various settings needed by any one of the decoders 6 to operate in keeping with the relevant format.

More specifically, executing step S110 involves selecting one of the decoders 6 by which to decode the stream data on the requested channel and making the necessary settings for the selected decoder 6. Then the demultiplexer 5 is arranged to supply the stream data to the selected decoder 6.

In step S111, the decoder 6 for which the settings have been made is prompted to execute a decoding process based on the settings. The decoder 6 thereby establishes synchronization between video data and audio data.

In step S112, the output switch section 7 is arranged to switch to the decoder 6 currently decoding the requested channel. In step S113, the output switch section 7 outputs the video and audio data on the requested channel.

If the check in step S102 reveals that the requested channel is a predecoded channel, then step S103 is reached. As discussed above, the stream data on each predecoded channel have already undergone the demultiplexing and decoding processes. The decoder 6 that is currently decoding is thus recognized in step S103, and the output switch section 7 is connected to the output of the recognized decoder in step S104.

In the manner described above, when a predecoded channel is requested by the channel select request, the digital broadcast receiver 1 of this embodiment can skip the demultiplexing and decoding processes carried out conventionally when a new channel is to be selected. In other words, what is being broadcast on the selected channel can be reproduced and output immediately after the operation to select that channel is executed.

The example explained above in connection with FIG. 2 involved setting as predecoded channels the channel number immediately preceding the currently-selected channel number and the channel number immediately following it. This scheme is effective when the successive channel select keys are operated to select one of the two predecoded channels, but not when the direct channel select keys are operated to select a channel number other than the two channels.

In order to deal with such an eventuality, this embodiment of the invention permits predecoding of the channels in descending order of their past select counts each representing the number of times a given channel has been selected so far.

Figure 3:
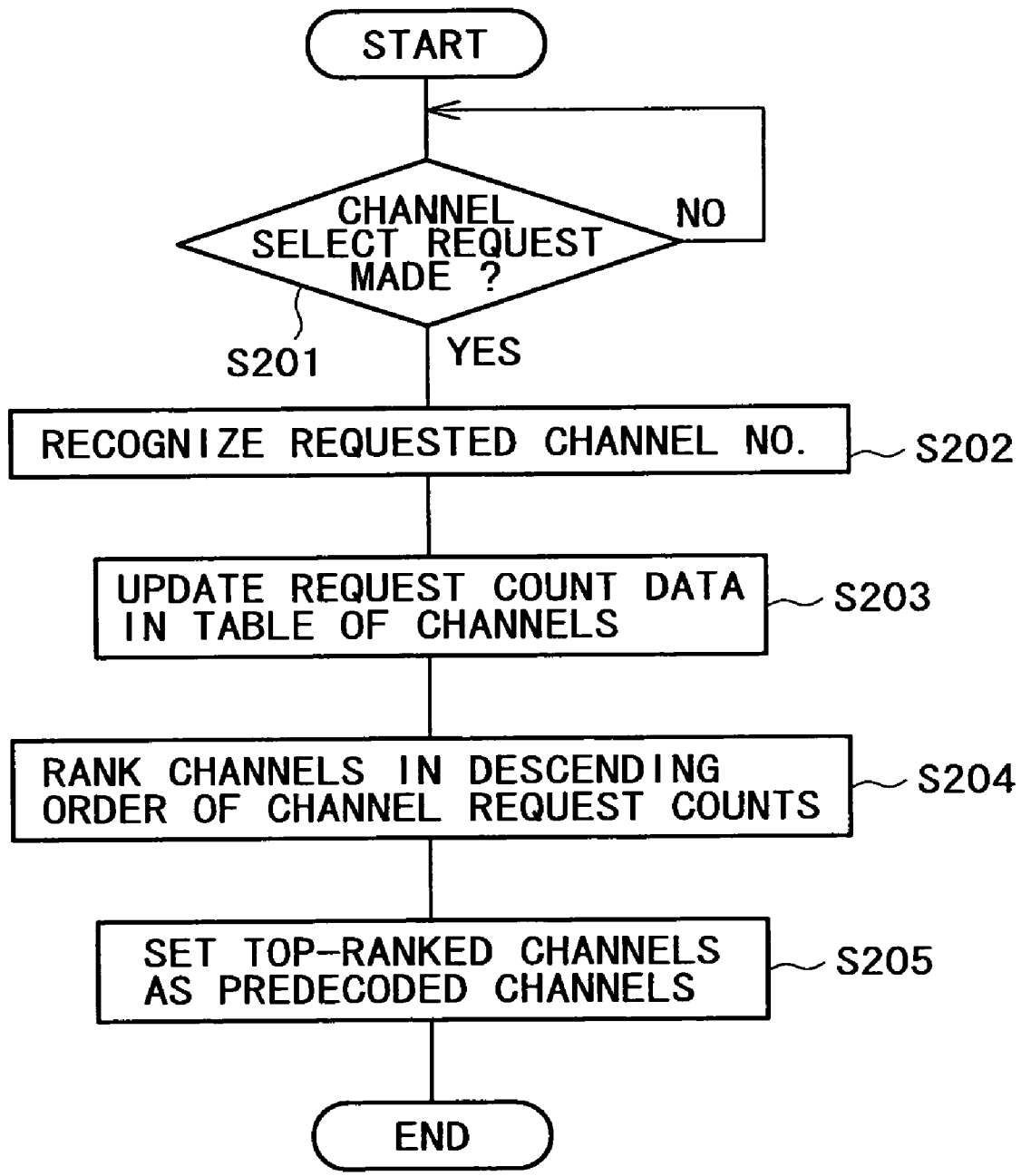
FIG. 3 is a flowchart of steps constituting a predecoded channel setting process carried out by the embodiment.

FIG. 3 is a flowchart of steps constituting the predecoded channel setting process in which the system controller 10 sets predecoded channels in descending order of the past select counts of the available channels.

The processing in FIG. 3 proceeds in parallel with the processing in FIG. 2, as in the above-described case in which the channel number immediately preceding the currently-selected channel and the channel number immediately following it are set as predecoded channels.

In step S201 of FIG. 3, a check is thus made continuously to see whether a channel select request is made. When the channel select request is detected, step S202 is reached. In step S202, the channel number of the requested channel is recognized.

In step S203, on the basis of the recognition in step S202, a relevant channel request count stored in correspondence with each of the available channels is updated.

More specifically, a predetermined area in the RAM 12 may be set aside to retain a table of the channels each associated with the number of times the channel in question has been requested in the past. When a channel select request is recognized, the request count data corresponding to the requested channel are updated in the table, whereby the select request count of each channel is properly managed.

In the manner described, the select request count data regarding the requested channel are updated in step S203. Step S203 is followed by step S204.

In step S204, the channels are ranked in descending order of their select request counts written in the table. In step S205, the first- and the second-ranked channels are illustratively set as predecoded channels based on the ranking determined in step S204.

When the processing of FIG. 3 is carried out as described, top-ranked channels are selected as predecoded channels in descending order of the past select counts of the available channels. The larger the number of times a given channel has been selected in the past, the more likely that channel will be selected by this digital broadcast receiver 1 as one of the predecoded channels.

It follows that with the processing of FIG. 3 executed, a channel select request issued illustratively by operation of the direct channel select keys is efficiently dealt with by this embodiment taking advantage of the effectiveness of its predecoded channel setting process.

As another example, it is also possible to set as predecoded channels top-ranked channels in descending order of channel select times each representing the length of time required to select each of the available channels. More specifically, on each of the available channels, a time period is measured starting from the time a channel select request is made until images of the requested channel are output. The longer the time it takes to output the video of a given channel, the higher the channel is ranked to be set as one of the predecoded channels.

Figure 4:
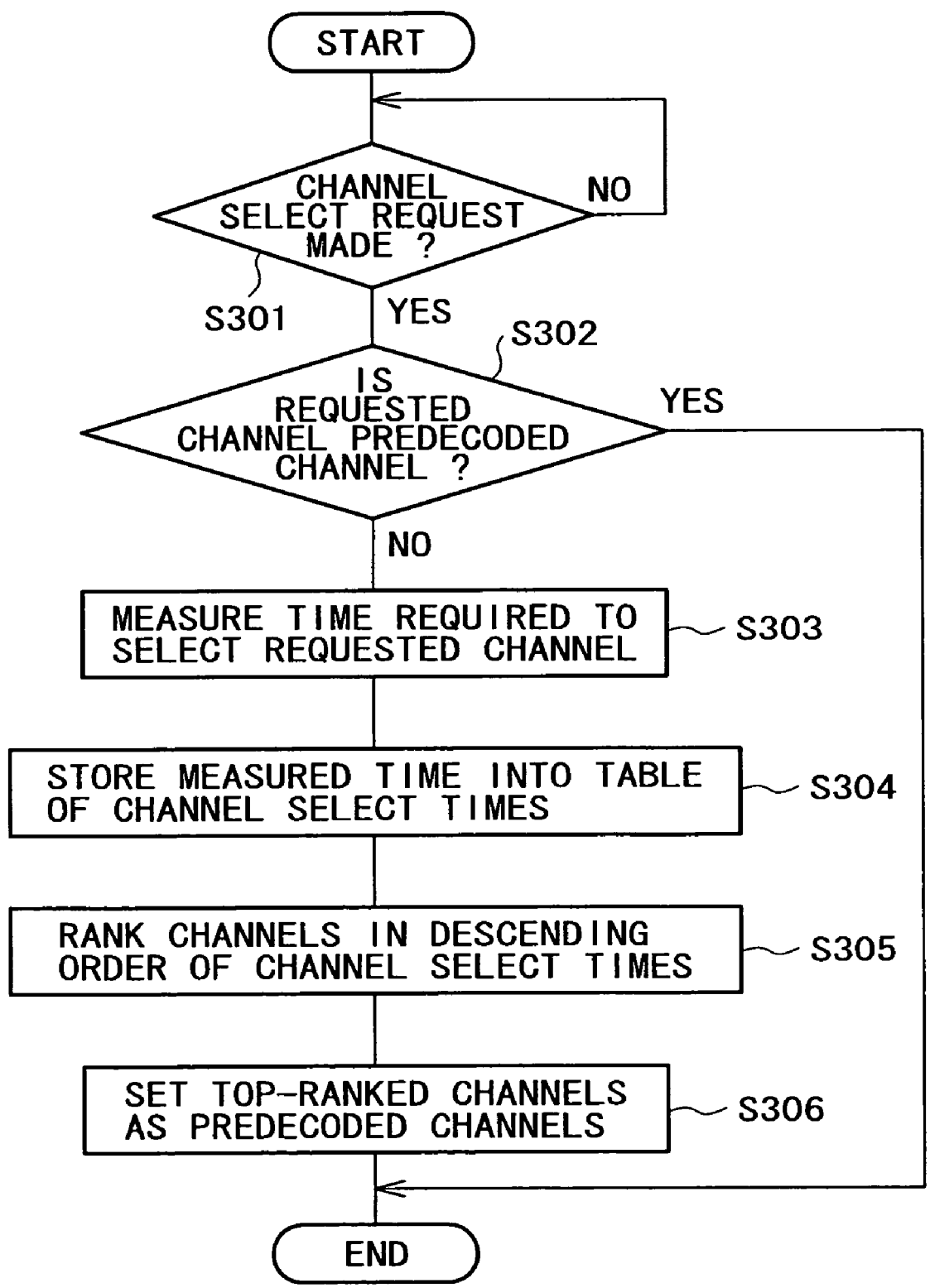
FIG. 4 is a flowchart of steps constituting another predecoded channel setting process executed by the embodiment.

FIG. 4 is a flowchart of steps performed by the system controller 10 selecting predecoded channels in descending order of the channel select times measured. The processing in FIG. 4 also proceeds in parallel with the processing in FIG. 2.

In step S301 of FIG. 4, a check is made continuously to see whether a channel select request is made. If the channel select request is recognized, step S302 is reached in which a check is made to see if the requested channel is a predecoded channel.

If the requested channel is found to be a predecoded channel, the routine of FIG. 4 is executed. No subsequent steps are then carried out to measure a channel select time. That is, step S302 is inserted here to prevent the steps that follow from getting executed wastefully to measure the channel select time for any channel having been predecoded.

If in step S302 the requested channel is not found to be a predecoded channel, step S303 is reached. In step S303, the time required to select the requested channel is measured.

In step S304, the channel select time thus measured is written to a table of channel select times. In this case, too, a predetermined area in the RAM 12 may be set aside to retain the table of channel select times each representing the length of time required to select each of the available channels. The channel select time measured in step S303 is written to this table.

In step S305, the channels are ranked in descending order of their select time by referring to the table of channel select times. In step S306, the first- and the second-ranked channels are illustratively set as predecoded channels based on the ranking determined in step S306.

When the processing of FIG. 4 is carried out as described, top-ranked channels are selected as predecoded channels in descending order of the past channel select times of the available channels. The longer the time period required to select a given channel in the past, the more likely that channel will be selected by this digital broadcast receiver 1 as one of the predecoded channels.

In the majority of cases, viewers of digital BS and CS broadcasts tend to view a relatively limited group of channels. Of such limited channels, those that it particularly takes time to select can thus be established preferentially as predecoded channels.

With the processing of FIG. 4 executed, it is possible to eliminate the presence of those channels which, when selected, arouse in viewers a sense of awkwardness because of the prolonged channel select time from the time a channel select request is made until images of the requested channel are output.

As described above, the digital broadcast receiver 1 embodying this invention includes a plurality of decoders, i.e., the first, the second and the third decoders 6a, 6b and 6c. One of the decoders decodes the selected channel (requested channel) and outputs the decoded result.

In parallel with the decoding process, the other decoders are arranged to predecode other channels than the requested channel. If any of the predecoded channels is selected by a channel select request, the inventive arrangement connects the output switch section 7 to the corresponding decoder that is predecoding, whereby the audio and video data on the requested channel are output.

That is, whenever switching to one of the predecoded channels, the digital broadcast receiver 1 of this embodiment can skip the demultiplexing and decoding processes conventionally required when predecoding is not implemented.

For this embodiment, the predecoded channels were shown to be set in one of three cases: the channel number immediately preceding the currently-selected channel and the channel number immediately following it are set as predecoded channels; top-ranked channels in descending order of the channel request counts of the available channels are set as predecoded channels; or top-ranked channels in descending order of the channel select times of the available channels are set as predecoded channels. However, these cases each presented as the rule by which to set predecoded channels are only examples and are not limitative of the invention.

Obviously, the number of predecoded channels is not limited to two. Three or more channels may be predecoded.

As another example, EPG (electronic program guide) multiplexed on digital broadcast signals may be utilized as a basis for setting predecoded channels. The predecoded channels in this case may be set illustratively as follows:

The program information included in EPG on the broadcast signals is referenced over time. This makes it possible to recognize and retain the name of, for example, the genre of broadcast programs most often watched by the user in the past. The channels carrying EPG describing the genre name thus recognized are established as predecoded channels.

As another alternative, information about the cast of the most-often-watched broadcast programs may be found out, and predecoded channels may be established accordingly. In this case, the user's preferences are reflected in the setting of the predecoded channels. This feature is convenient for users who frequently watch a specific genre of broadcast programs.

Although the signal processing apparatus according to the invention was shown applied to the digital broadcast receiver 1 of this embodiment, this is not limitative of the invention. Alternatively, the inventive signal processing apparatus may be applied advantageously to hard disc drive (HDD) recorders or like equipment allowing any one of a plurality of streams of encoded data to be selectively decoded and output.

Figure 5:
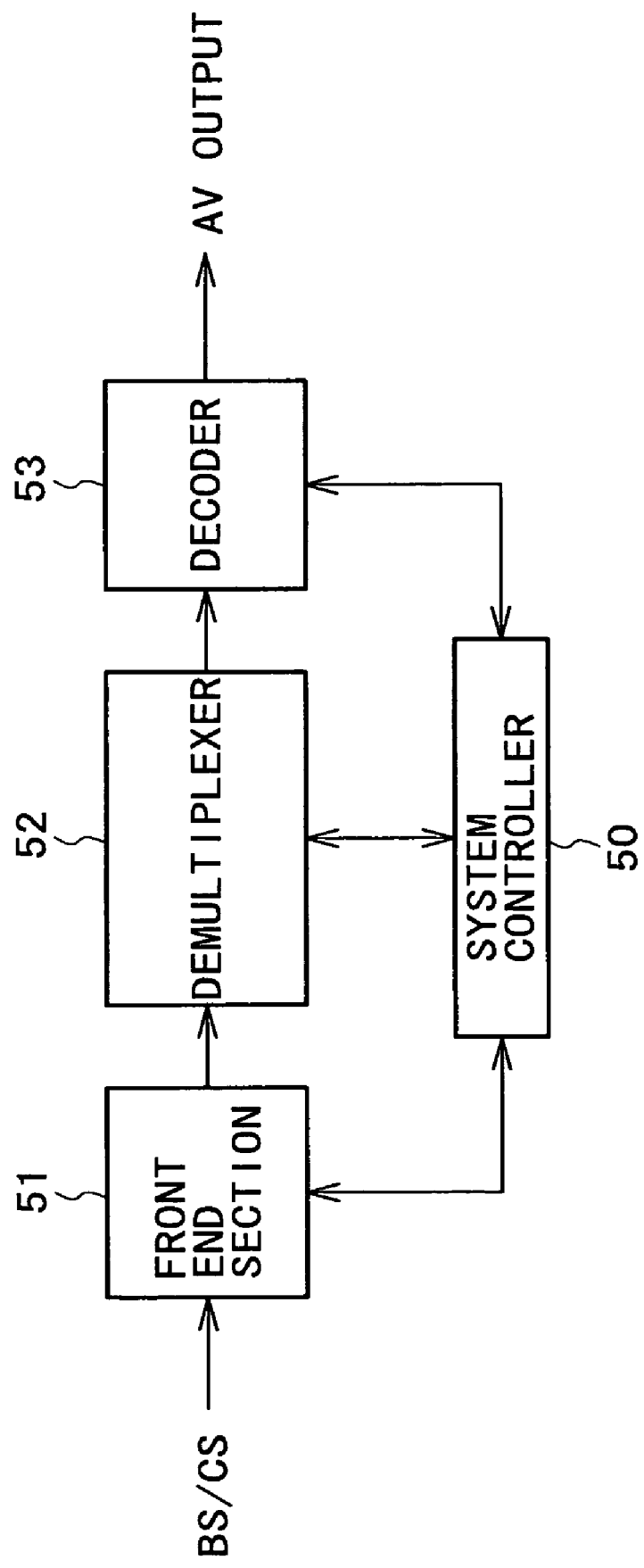
FIG. 5 is a schematic block diagram outlining a typical structure of a conventional digital satellite broadcast receiver.
Figure 6:
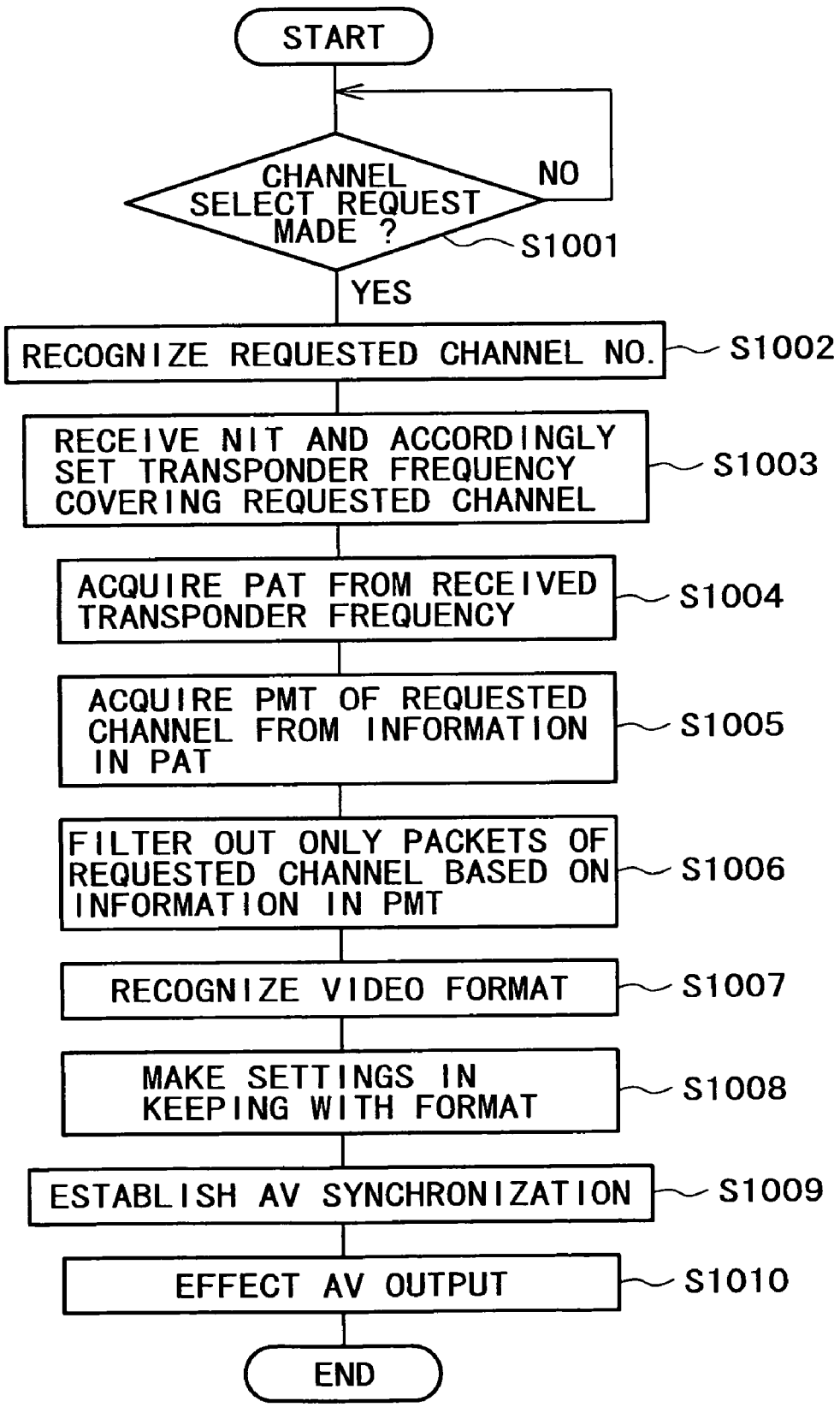
FIG. 6 is a flowchart of steps constituting a channel selection process performed by the conventional digital satellite broadcast receiver.

In a typical HDD recorder, a plurality of transport streams (TS) are input to its HDD equivalent to the front end section 51 of FIG. 5. Conventionally, of the multiple transport streams stored on the HDD, the requested TS is selectively reproduced and output through demultiplexing and decoding.

When the signal processing apparatus of this invention is applied to the example above, a plurality of decoders are installed so that some of them may receive from the HDD the transport streams determined preferentially by a predetermined rule for predecoding purposes. The scheme makes it possible immediately to output and display any one of the predecoded transport streams which is currently requested by the channel selected request.

The signal processing apparatus of this invention may also be applied to so-called Internet radio equipment for reproducing and outputting the data broadcast by Internet radio stations. Such equipment is typically arranged to buffer a predetermined quantity of data from each selected broadcast channel. Every time a new channel is selected, it takes some time for the data on that channel to be reproduced and output.

When the inventive signal processing apparatus is applied to the above equipment, the data on preselected channels other than the currently-reproduced channel may be buffered and decoded in advance. This arrangement makes it possible to reduce significantly the length of time from the time a channel select request is issued until the data on the requested channel are reproduced and output.

Although the inventive signal processing apparatus was shown applied to the digital broadcast receiver 1 of this embodiment in which the decoders 6 are designed to comply with the MPEG-2 standard, this is not limitative of the invention. Alternatively, the decoders 6 may be arranged to comply with other video compression methods. Furthermore, the decoders may also comply with such audio compression methods as WMA (Windows (registered trademark) Media Audio) and ATRAC-3 (Adaptive TRansform Acoustic Coding Version 3).

Although the embodiment above was presented using examples in which the signal processing apparatus is implemented as part of hardware, this is not limitative of the invention. Alternatively, the signal processing apparatus may be implemented on a software basis.

In addition, although this embodiment was shown having the first, the second and the third decoders 6a, 6b and 6c implemented as independent pieces of hardware, this is not limitative of the invention. Alternatively, a single decoder of relatively high performance may be arranged to execute the functions of the multiple decoders 6 on a time-shared basis. The effect of the alternative setup is still the same.

INDUSTRIAL APPLICABILITY

As described, the signal processing apparatus according to this invention permits decoding of encoded data requested to be reproduced and output by use of a reproduction output request. Concurrently, the signal processing apparatus predecodes encoded data that are selected in keeping with a predetermined rule.

If a new reproduction output request is made for the encoded data preselected as per the predetermined rule, the data need only be output with no further intervention because they have been predecoded.

That is, when the encoded data selected in accordance with the predetermined rule are to be reproduced and output, the inventive apparatus has no need for the demultiplexing and decoding processes that are required conventionally upon switchover to newly-selected data.

As a result, the signal processing apparatus of this invention drastically reduces the time that elapses from the time a reproduction output request is made until the encoded data requested thereby are output. The user operating the digital broadcast receiver is thus able to make smoothly-executed channel select operations.

The invention claimed is:

1. A signal processing apparatus comprising:
   inputting means for inputting a designated plurality of encoded data;
   encoded data selecting means for selectively outputting a designated plurality of encoded data from a plurality of encoded data which have been input by said inputting means;
   a plurality of decoding means for individually inputting the plurality of encoded data selected by said encoded data selecting means while decoding the encoded data which have been input;
   encoded data designating means for designating encoded data for said inputting means and for said encoded data selecting means in such a manner that in response to a reproduction output request, the encoded data requested to be reproduced and output and other encoded data which are selected in accordance with a predetermined rule and which differ from said encoded data requested to be reproduced and output are input individually to said plurality of decoding means for predecoding; and
   reproduction output controlling means for controlling said plurality of decoding means to output said encoded data requested to be reproduced and output following the decoding in response to said reproduction output request,
   wherein said predetermined rule stipulates that said plurality of encoded data, which have been input by said inputting means, are ranked in terms of a channel select time which is a time period measured from the time a request to select a channel corresponding to the requested encoded data is made until the requested encoded data are output, and that top-ranked encoded data are selected in descending order of the channel select times.

2. The signal processing apparatus according to claim 1, wherein said predetermined rule stipulates that, of the plurality of encoded data which have been input and acquired by said inputting means receiving digital broadcasts, the encoded data corresponding to a broadcast channel number either preceding or following the broadcast channel number representing said encoded data requested to be reproduced and output are selected.

3. The signal processing apparatus according to claim 1, wherein said predetermined rule stipulates that said plurality of encoded data which have been input by said inputting means be ranked in terms of a reproduction output request count representing the number of times said reproduction output request is made for specific encoded data, and that top-ranked encoded data are selected in descending order of the reproduction output request counts.

4. The signal processing apparatus according to claim 1, wherein said predetermined rule stipulates that the encoded data be selected which are determined on the basis of information which is multiplexed on broadcast signals input by said inputting means and which indicates broadcast genres.

5. A signal processing method comprising the steps of:

inputting by an inputting means, a designated plurality of encoded data;

selectively outputting a designated plurality of encoded data from a plurality of encoded data that have been input;

individually inputting the selected plurality of encoded data while decoding the encoded data which have been input;

designating encoded data for said inputting step and for said encoded data selecting step in such a manner that in response to a reproduction output request, the encoded data requested to be reproduced and output and other encoded data which are selected in accordance with a predetermined rule and which differ from said encoded data requested to be reproduced and output are input individually for predecoding; and outputting said encoded data requested to be reproduced and output following the decoding in response to said reproduction output request, wherein said predetermined rule stipulates that said plurality of encoded data, which have been input by said inputting means, are ranked in terms of a channel select time which is a time period measured from the time a request to select a channel corresponding to the requested encoded data is made until the requested encoded data are output, and that top-ranked encoded data are selected in descending order of the channel select times.

6. The signal processing method according to claim 5, wherein said predetermined rule stipulates that, of the plurality of encoded data which have been input and acquired through reception of digital broadcasts, the encoded data corresponding to a broadcast channel number either preceding or following the broadcast channel number representing said encoded data requested to be reproduced and output are selected.

7. The signal processing method according to claim 5, wherein said predetermined rule stipulates that said plurality of encoded data which have been input be ranked in terms of a reproduction output request count representing the number of times said reproduction output request is made for specific encoded data, and that top-ranked encoded data are selected in descending order of the reproduction output request counts.

8. The signal processing method according to claim 5, wherein said predetermined rule stipulates that the encoded data be selected which are determined on the basis of information which is multiplexed on input broadcast signals and which indicates broadcast genres.

* * * * *